3,073,709
CEMENT
Evangelos C. Artemis, Glyfada, Greece
No Drawing. Filed Sept. 9, 1959, Ser. No. 838,825
13 Claims. (Cl. 106—121)

This invention relates to cements and more particularly pertains to a washable, water-proof type of cement and is a continuation-in-part of my application Serial No. 523,101, filed July 19, 1955, now abandoned.

The known types of water-proof and washable cements are known to have certain shortcomings, among which is the fact that some are difficult to manufacture, and others do not have the requisite properties particularly with respect to their being water-proof under severe conditions of use. Another drawback of the prior art cements of this general type is that when used as a coating over iron, oxidation of the iron results and the attendant expansion when the iron is converted into iron oxide causes the cement coating to crack and peel off.

With knowledge of these drawbacks of the prior art cements I have devised according to this invention an improved water-proof cement and method for making same, having unusual characteristics which will provide a mortar that completely resists any leakage even when subject to hydrostatic pressures of several atmospheres. Moreover, the characteristics of this improved cement are such that it particularly lends itself to application to materials containing iron without oxidizing the iron and without the normally resultant flaking off of the cement coating.

Described briefly, the improved cement of this invention comprises an admixture of two or more magnesium oxides which have been subjected to different treatments so that although their essential ingredients are the same and they may be represented by the same chemical formula, nevertheless, the respective magnesium oxides have markedly different crystalline structures and therefore exhibit markedly different properties. In a preferred embodiment of this invention, the cement comprises not only these different oxides of magnesium, but also comprises a prescribed amount of serpentine and also a prescribed amount of a heavy-bodied soap.

The preferred method for obtaining the improved cement of this invention comprises the following steps:

The starting material may comprise a magnesium carbonate such as magnesite and dolomite. The magnesium carbonate is first broken up by any manner well-known in the art to particles of nut size. Following this, the magnesium carbonate is calcinated at a temperature suitably high and for a time sufficiently long to cause carbon dioxide to be liberated. Preferably the calcination of the rock takes place in a furnace under conditions where there will be a reduction of the material rather than an oxidation since it has been found that, under these circumstances, the material as it comes from the furnace exhibits greater chemical activity.

With respect to the above calcination of the starting material of this method, it has been found in numerous experiments that desirable results are obtained by placing the magnesite in a furnace which may be an electric furnace in the presence of a reducing atmosphere and with an initial temperature of 800° centigrade. The material is allowed to remain in the furnace for approximately one hour and during this time the furnace temperature is allowed to increase to approximately 1200° centigrade. Further experiments have demonstrated that the temperature may be permitted to exceed 1200° and may even be permitted to go as high as 1500° C. For the higher temperatures, i.e., those in excess of 1200°, it is found that the time in the furnace must be reduced. When the temperature is permitted to exceed 1200° C., there is then the danger of forming with the magnesite a pyro-chemical compound comprising various impurities, and the overall properties are such that it then tends to become a kind of clinker or dead magnesia which is found to be suitable for the making of certain types of refractory bricks, but found to be undesirable for the making of the improved cement of this invention. This is the principal reason why it is preferable to maintain the temperature of this first calcination at a value not exceeding 1200° C. It has been found that the temperature of calcination may be steadily maintained at about 1200° C. rather than being variable between 800° C. to 1200° C. In that event, the time of calcination may be made slightly less than one hour. In actual practice, the time and temperature required to obtain optimum results are dependent on several variables and can best be obtained by experiment.

Upon removal from the furnace, the magnesium oxide is rapidly cooled, preferably by dipping it at once into cold water which is free of excessive amounts of salts. The dipping into water causes a well-known reaction to take place which results in the formation of magnesium hydroxide. Preferably the oxide upon being immersed in the water is maintained there for approximately 24 hours at which time it is removed from the water and allowed to dry.

The rapid cooling of the magnesium oxide which results from immersing the magnesium oxide into the cooled water is an important part of the present process. The rapid cooling or freezing brings about a molecular disorder or rearrangement of the calcinated oxides of magnesium. More specifically, throughout the first calcination step described above, considerable energy is imparted to the moluecules so that they collide with one another by palpitating rapidly and there is then a considerable desorption of carbon dioxide. However, the rapid change of the substance from the hot state which it has in the furnace to the drastically cooler temperature of the cold water in which it is immersed instantly arrests the pulsating action of the molecules with each other so that they fall into a random state of inactivity. If the material were permitted to cool slowly, a regular state of equilibrium would be established and the various crystals would then show a tendency to combine in a definite order. The tendency for the molecular disorder to occur as a result of the above-described freezing action is shown by the fact that the resulting product when pulverized into fine particles takes on hydroxyl groups in the place of carbon dioxide. The disorder is further evidenced by a quite striking resulting change in a physical characteristic of the magnesium oxide, i.e., an increase in its specific gravity by 0.2. The magnesium oxide which is formed as a result of the above-described steps involving a first calcination, will hereafter be known as a "primary treatment magnesium oxide."

To further carry out the method of this invention, a quantity of the primary treatment magnesium oxide after drying is again calcinated in a furnace in the presence of a reducing atmosphere, and this time the material is allowed to remain in the furnace for approximately 45 minutes with a temperature which may vary over the same range as described above for the first calcination, i.e., a temperature of approximately 1200° C. At the end of this time, the magnesium oxide so treated, which will not be referred to as secondary treatment magnesium oxide, is again quickly cooled but preferably this time by placing it in cool air which may be at ordinary room temperature.

This secondary treatment magnesium oxide is by itself an improved cement. Preferably, however the improved cement of this invention comprises portions of the primary treatment magnesium oxide, the secondary treatment magnesium oxide, and serpentine of the general formula ($H_4Mg_3Si_2O_9$) and mixtures thereof. Although the precise proportions used are not of especial significance, it has, nevertheless, been found that a highly effective cement composition may be formulated by mixing together the following proportions by weight of the various materials just mentioned:

| | Parts |
|---|---|
| Primary treatment magnesium oxide | 1 |
| Secondary treatment magnesium oxide | 2 |
| Serpentine | 3 |

To the above materials it has been found to be very desirable to add a relatively small quantity of a heavy-bodied soap comprising either sodium oleate or oleic acid. More specifically, it has been found that a quantity of sodium oleate consisting of 0.5% of the total mixture by weight is desirable or, alternatively, when oleic acid is added instead of sodium oleate, then the desired quantity has been found to be in the order of 0.2% of oleic acid.

All of the above materials, i.e., the primary magnesium oxide, secondary treatment magnesium oxide, serpentine and sodium oleate or oleic acid, are after being together all powedered in order to pass through a 300-mesh screen. The resulting cement powder when mixed with and hardened, shows small surface stress, is water-proof, and exhibits a bright surface and furthermore presents the highly desirable characteristic of adhering to organic surfaces. Since it has a micro-crystalline texture, it may readily be plastered by means of brushes or atomizers, with a thickness of a as little as ½ millimeter. It can also be used as an inner cement and is not attacked by water.

The addition of the sodium oleate or oleic acid, as described above, is particularly for the purpose of helping the cement to mix with other materials and for improving its water-proofing characteristics. As is well known, oleic acid when exposed to air absorbs oxygen in the amount of 20 times its own volume and this property enables the building up of a voluminous body of material. When the resulting cement is mixed with water, the sodium oleate, if this material is used, is split into sodium carbonate and aleic acid which later combines with the serpentine and magnesium oxide to produce a type of magnesium silicate emulsion having a colloidal nature which is eventually assimilated by the crystal lattice structure of that substance by decreasing the surface stress. The use of either the oleic acid or the sodium oleate has the function also of forming a retaining means within the crystal structure of the cement which acts to prevent a definite system of crystallization within the cement during the course of its formation. In this connection, it might be said that it has been found important not to use excessive amounts of the sodium oleate or oleic acid since it has been found that this tends to defeat the water-proofing properties of the resulting cement.

With respect to the use of the serpentine in the mixture, this material is carefully powdered into a fine from before being added to the rest of the ingredients. This material when mixed with water in the normal use of the cement and then again exposed to the air, becomes solid and insoluble in water. When examined by microscope after its use, according to the method of this invention, the serpentine is found to possess biaxial crystals of the same type which it normally has in its natural condition, and the serpentine has the property of combining readily with both the primary and secondary treatment magnesium oxides. When thus combined, it changes from the magnesium bisilicate into an indefinite formula of magnesium silicate. The serpentine combines by means of the hydroxyls present in the special primary and secondary treatment magnesium oxides to produce indefinite crystal lattices.

It is to be emphasized that the manner in which the various primary and secondary treatment magnesium oxides and the serpentine combine in the disordered molecular structure is dependent upon the particular properties that the primary and secondary treatment magnesium oxides assume as a result of their manner of treatment; more specifically, the time and temperature of heating and the quick freezing, especially by the immersion of the primary treatment magnesium oxide into cold water. The primary secondary treatment magnesium oxides have quite different properties and these properties are obtainable by carrying out the above-described steps of heating and subsequent rapid cooling. As previously mentioned, one outstanding difference in their physical characteristics is an increase in the specific gravity of the secondary treatment magnesium oxide as compared to the primary treatment magnesium oxide. One other outstanding difference between the two is that the addition of water to the primary oxide is found to produce an exothermic reaction, whereas the addition of water to the secondary treatment magnesium oxide produce an endothermic reaction.

One unusual characteristic of the cement produced according to the method of this invention becomes apparent when it is used as a coating on iron-bearing material as, for example, on reinforcing rods used in structural concrete. Thus, it is well known that when iron is coated with concrete or Portland cement which is exposed to moisture and atmospheric air, severe corrosion results. The resulting iron oxide product undergoes an increase in volume of more than two times so that there is a considerable pressure developed on any cement coating which might be applied to such iron. Because of this pressure, there is a bursting of the cement coating and a resulting destruction thereof. However, when iron is coated with a thin layer of the cement of the present invention, or when a small amount of this cement is added to ordinary concrete, this deleterious condition does not result. It is believed that this considerable improvement comes about as a result of the movement of ions from the cement of this invention towards the iron so that a protective film is formed which prevents oxidation.

In an attempt to develop data which might be explanatory of this remarkable improvement, tests were conducted using the Poggendorff method, using an auxiliary calomel electrode. The following data resulted:

*Voltage Developed*

| | Volts |
|---|---|
| Uncoated iron | +0.3885 |
| Iron coated with ordinary cement | +0.3675 |
| Iron coated with concrete containing 12% of the cement of this invention | −0.1895 |

The above striking results showing that the iron voltage developed when measurements were taken by the Poggendorff method is drastically reduced when a small quantity of the cement of this invention is added to ordinary cements. These results are believed to be attributable to the molecular disorder of this substance in view of the special processing that it undergoes as described above. More specifically, the positive iron voltage normally present with no coating shows that the iron gives ions. When coated with ordinary concrete, the voltage is slightly reduced but not to any appreciable extent. When the iron is coated with concrete to which there has been added a small quantity of the cement of this invention, the voltage is not only greatly reduced in amplitude but is of opposite polarity, indicating that the iron receives ions from its environment. An examination of the theory of disorder in crystal structure reveals that the giving of ions to the iron must come about entirely as a result of a disorder in the molecules of magnesium oxide in that a free space is formed in the molecule. The overall result as evidenced by the above data is conclusive that use of the cement of this invention is highly advantageous in reducing the formation of iron oxide at the interface between an iron-bearing material and concrete.

Having described an improved cement and its method of manufacture as one specific embodiment of this invention, it is to be understood that various adaptations, modifications and later alterations may be made without departing in any manner from the spirit or scope of this invention.

I claim:

1. The process of making an ingredient for use in a cement having a reduced corrosive effect on iron-bearing reinforcing elements in contact therewith, said process comprising the steps of: calcinating magnesium carbonate at a temperature in the range of 800° C. to 1200° C. for a period of approximately one hour, immersing the calcinated product immediately thereafter in cold water to effect a quick freezing, drying the frozen product, again calcinating the frozen product in a reducing atmosphere over substantially the same temperature range as the first calcination but for a time approximately 45 minutes, cooling the product of the second calcination in air to thereby form the desired product.

2. The process of making a cement comprising the steps of calcinating magnesium carbonate at a temperature range of 800° C. to 1200° C. for a period of approximately one hour followed by direct immersion in cold water to thereby form a primary treatment magnesium oxide, drying the primary treatment magnesium oxide, again calcinating the dried primary treatment magnesium oxide in a reducing atmosphere over substantially the same temperature range as the first calcination but for a time of approximately 45 minutes, cooling the product of the second calcination in air, intimately mixing said primary and secondary treatment magnesium oxides in the approximate relative proportions by weight of the total of one and two parts respectively.

3. The process of making a cement comprising the steps of calcinating magnesium carbonate at a temperature varying from an initial value of 800° C. to a final temperature of 1200° C. over a time interval of approximately one hour followed by direct immersion in cold water to thereby form a primary treatment magnesium oxide, mixing a portion of said primary treatment magnesium oxide with a portion of secondary treatment magnesium oxide formed by a second calcination of said primary treatment magnesium oxide in a reducing atmosphere where said second calcination occurs over substantially the same temperature range as the first calcination but for a time of approximately 45 minutes and wherein the product of said second calcination is quickly cooled in air, mixing the combination of said primary and secondary treatment oxides and also serpentine in the approximate relative proportions by weight of the total of approximately one, two and three parts respectively, and adding to the above ingredients approximately 0.5% by weight of the total ingredients of sodium oleate.

4. The process of making a cement comprising the steps of calcinating magnesium carbonate at a temperature varying from an initial value of 800° C. to a final temperature of 1200° C. over a time interval of approximately one hour followed by direct immersion in cold water to thereby form a primary treatment magnesium oxide, mixing a portion of said primary treatment magnesium oxide with a portion of secondary treatment magnesium oxide formed by a second calcination of said primary treatment magnesium oxide where said second calcination occurs in a reducing atmosphere over substantially the same temperature range as the first calcination but for a time of approximately 45 minutes and wherein the product of said second calcination is quickly cooled in air, mixing the combination of said primary and secondary treatment oxides and also serpentine in the approximate relative proportions by weight of the total of approximately one, two and three parts respectively, and adding to the above ingredients 0.2% by weight of the total ingredients of oleic acid.

5. A waterproof cement consisting substantially only of a primary treatment magnesium oxide, a secondary treatment magnesium oxide and serpentine in the relative proportions by weight of the total ingredients of approximately one, two, and three parts, said primary treatment magnesium oxide being formed by the calcination of magnesium carbonate at a temperature in the range of 800 to 1200° C. for a period of approximately one hour followed by immediate immersion thereafter in cold water to effect a rapid freezing of the product of said calcination, said secondary treatment magnesium oxide being formed by again calcinating a portion of said primary treatment magnesium oxide in a reducing atmosphere at substantially the same temperature as said first calcination but for a period of only approximately 45 minutes followed by quick cooling of the product of said second calcination in air.

6. The process of making a cement comprising the steps of calcinating magnesium carbonate at a temperature of approximately 1200° C. for a time of approximately one hour, freezing the calcinated product by immersion in cold water immediately after calcination, again calcinating the cooled product of said first calcination over substantially the same temperature range as the first calcination but in a reducing atmosphere, and quickly cooling the product of the second calcination step to form a cement having hydraulic properties.

7. The method of making a water-proof cement comprising primary treatment and secondary treatment magnesium oxides wherein said primary treatment magnesium oxide is formed by calcinating magnesium carbonate at a temperature varying from an initial value of 800° C. to 1200° C. during a calcinating time of approximately one hour and wherein the calcinated product is immersed in cold water directly after said calcination, and wherein said secondary treatment magnesium oxide is formed and again calcinating said primary treatment magnesium oxide in a reducing atmosphere over said same temperature range but for a time interval of approximately 45 minutes followed by a quick cooling in air of the product of said second calcinating step, and thoroughly mixing together approximately one portion of said primary treatment magnesium oxide with approximately two portions of said secondary treatment magnesium oxide and with approximately three portions of serpentine, each of said portions being by weight of the total ingredients.

8. The process of making a cement comprising the steps of calcinating magnesium carbonate at a temperature varying from an initial value of 800° to 1200° C. for a time interval of approximately one hour followed by direct immersion in cold water to thereby form a primary treatment magnesium oxide, mixing a portion of said primary treatment magnesium oxide with a portion of secondary treatment magnesium oxide formed by a second calcination of said primary treatment magnesium oxide in a reducing atmosphere with said second calcination occurring over the same temperature range as the first calcination but for a time of approximately 45 minutes and wherein the product of said second calcinating step is quickly cooled in air, and mixing the combination of said primary and secondary treatment oxides and also serpentine in the relative proportions by weight of the total of approximately one, two, and three parts respectively.

9. A water-proof cement consisting by weight of substantially one part of a primary treatment magnesium oxide, two parts of a secondary treatment magnesium oxide and three parts of serpentine, said primary treatment magnesium oxide being formed by the calcination of magnesium carbonate at a temperature not exceeding 1200° C. for a time interval of approximately one hour followed by direct immersion in water to effect a quick freezing, said secondary treatment magnesium oxide being formed by a second calcination of said primary treatment magnesium oxide in a reducing atmosphere at a temperature not exceeding 1200° C. and for a time of approximately 45 minutes followed by air cooling of the product of said second calcination.

10. A water-proof cement consisting substantially of a secondary treatment magnesium oxide formed by the steps of first calcinating magnesium carbonate at a temperature not exceeding 1200° C. for a period of approximately one hour to form a primary treatment magnesium oxide immersing the product of said calcination in cold water to effect a rapid freezing, again calcinating the product of said first calcination in a reducing atmosphere at a temperature again not exceeding 1200° C. for a period of approximately 45 minutes, and quickly cooling the product of said second calcination in air.

11. The product as defined in claim 5 to which is added sodium oleate consisting of 0.5% of the total mixture by weight.

12. The product as defined in claim 5 to which is added 0.2% by weight of oleic acid.

13. The product as defined in claim 5 wherein all the ingredients are ground finely so as to pass through a 300-mesh screen.

References Cited in the file of this patent
UNITED STATES PATENTS

| | | |
|---|---|---|
| 785,841 | Turner | Mar. 28, 1905 |
| 1,532,500 | Kilbourn | Apr. 7, 1925 |
| 1,881,283 | Lukeus | Oct. 4, 1932 |
| 2,423,839 | McGarvey | July 15, 1947 |
| 2,658,814 | Woodward | Nov. 10, 1953 |